Patented Dec. 9, 1952

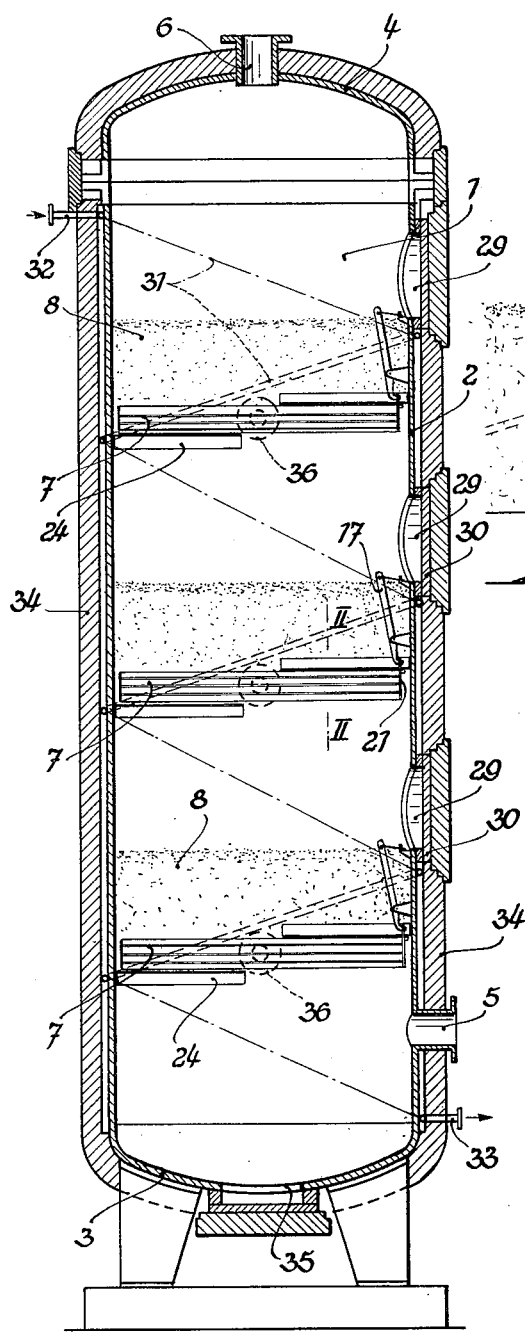
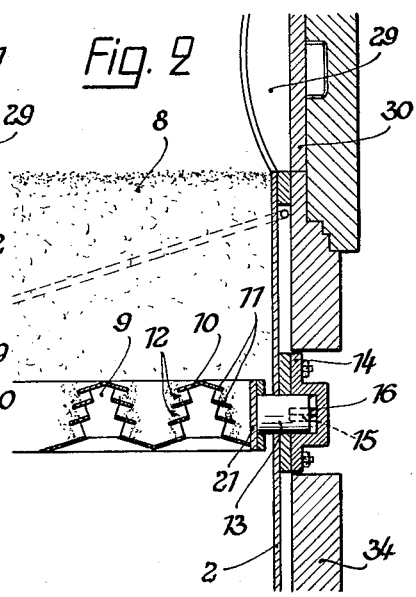
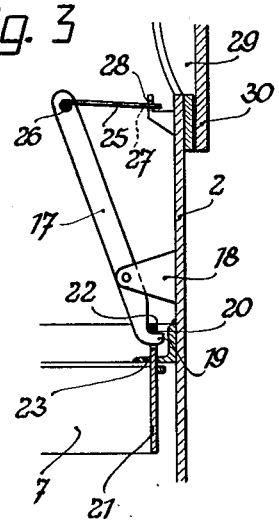

2,621,112

UNITED STATES PATENT OFFICE 2,621,112

VERTICAL PURIFIERS OR THE LIKE

Adolf Schmalenbach, Essen-on-the-Ruhr, Germany, assignor, by mesne assignments, to Koppers Company, Inc., Pittsburgh, Pa., a corporation of Delaware Application September 28, 1949, Serial No. 118,317
In Germany October 1, 1948

7 Claims. (Cl. 23—284)

The invention relates to apparatus for treating gases, such as coke oven gas, or vapours, for instance vaporized benzene, by bringing the gases or vapors to be treated in contact with a coarse, solid material.

Especially the invention relates to so-called vertical purifiers or similar apparatus, characterized principally in that such apparatus comprise a tower-like casing or columnar shell, preferably a cylindrical, in which are arranged a series of horizontal grids or the like in superimposed relation and spaced from each other to form an uprising series of gas and solid contact compartments between a lower gas inlet and an upper gas outlet for the shell, said grids being suitable for supporting the solid material which is to come into contact with the gaseous fluid in the compartments.

By the expression "purifier" as used in the following specification and claims, I wish to be understood any apparatus suitable for bringing gaseous media into contact with any coarse, solid material. The particular solid material employed will depend on the nature of the gas or vapor that is to be processed and the reaction contemplated i. e., whether physical or chemical. Purifiers of the kind referred to may be used for instance in order to remove from coke oven gas such impurities as sulphuretted hydrogen which, as is known, involves the chemical reaction of $H_2S$ with iron oxide to form iron sulphide. Usually an alkaline material is also employed which acts as a carrier for the S of the $H_2S$ to the iron compound, and in this case the purifier is charged with layers of iron oxides known as Lux's or Laming's mass being supported by grids inside the purifier, which must be removed and renewed at periodic intervals.

The object of the invention is to provide an improved purifier in which the gas stream must pass through all the series of compartments, and is subdivided very finely before contacting the solid purifying material in the several compartments in order to arrive at a complete reaction, for instance absorption of the impurities to be removed from the gaseous matter much in the manner as obtains with gas and liquid contact with bubble cap tray towers used in petroleum distillation practice. A further object is to remove from the purifier quickly by mechanical means the spent solid material without much manual labour.

Therefore, the principal feature of the invention consists in that the grids of the vertical purifier are formed by horizontal partitions equipped with openings provided with hoods, the sides of which being inclined as to permit the passage of the gas only in fine streams and to prevent any dropping of the solid purifying material from the grids.

In order to remove the spent purifying material by mechanical means the invention provides that the grids are arranged rotatable around their horizontal axis to tilt the grids from their horizontal position to an upright position, to discharge the solid material to an outlet therefor at the bottom of the shell. For such mechanical tilting each grid has a pivot member accessible through openings in the side of the shell for application of mechanical means, from outside the side of the shell, individually to the pivots, to tilt the grids for their discharge, and to return them to their horizontal position for reloading with fresh solid contact material. In the horizontal, operative position the grids may be secured by suitable locking means to be operated from the outside through a series of manholes or other openings individual to the compartments and disposed one above another in the side of the casing for charging the purifying material into the compartments formed by said grids.

A still further feature of the present invention consists in that the purifier is provided with heating means in the form of a chamber surrounding the shell and a cover of heat insulating material around the heating chamber. As a result of such provisions the purifying material should remain in dry condition to prevent a clogging in the gas passages of the grids.

The invention is demonstrated in the drawing illustrating by way of example a preferred type of construction.

Fig. 1 is a vertical, sectional view of the purifier embodying the principles of this invention.

Fig. 2 is a partial, vertical sectional view of the purifier taken along the line II—II of Fig. 1 on an enlarged scale.

Fig. 3 shows the locking means of the grids on an enlarged scale.

The tower-like purifier or vertical columnar shell I is formed of a cylindrical, metal casing 2 provided in the lower part with a bottom 3 and in its upper part with a top 4. The gas is fed to the lower part of the purifier through an inlet 5 and is discharged at the top through an outlet 6 in purified condition. In the purifier I are arranged grids 7 spaced above each other forming compartments therebetween and supporting the purifying material 8. Hoods 9 are provided on the grids and form passages suitable for finely subdividing the gas stream to be passed through the purifying material during its passage from a lower to a higher compartment.

The hoods 9 are formed on the principle of the well-known bubble caps used in distillation practice. They each comprise a cover 10 and side walls formed by a series of metal sheets 11 which are vertically spaced from one another and are inclined in such a manner that the gas to be contacted with the purifying material supported by the grids, on passing from each compartment to the next, may flow through the spaces 12 between said metal sheets, the solid purifying material, however, is prevented from dropping through the said spaces.

The grids 7 are equipped on each side with a pivot 13 supported by bearings provided in the casing 2. These pivots and bearings are located in the horizontal center line 36 of the grids. The bearings are covered outside by a removable cap 14. The pivot 13 is provided with a groove 15 into which engages a lever (not shown on the drawing), after the cap 14 has been removed. By means of this lever the grids may be rotated to remove the spent purifying material after the locking means, which will be described in detail later, has been released. The cap 14 has a projection 16 which engages the groove 15. The locking means comprises a lever 17 pivoted on the bracket 18 which is attached to the casing 2 of the purifier. The lower end of the lever 17 is bent—as shown at 19—in such a manner that the end of the lever will engage in an opening 20 provided therefor in an extension 22 of the side wall 21 of the grid 7 while the grid is in horizontal, operative position. This extension 22 passes through an opening in an iron clamp 23 affixed to the casing 2 when the grid is in operative position. The iron clamps 23 as well as the bent angles 24, affixed to the inside of the shell above and below the grids on the opposite side of the center line 36 of the casing 2, are used to keep the grid in its horizontal position and limit its tilting to the vertical position. At the upper part of lever 17, the end of a bar 25 is hinged to a bolt 26 while the other end of the bar forms an eye 27 which fits a hook 28 attached to the casing 2. The whole locking arrangement may be operated from outside through manholes 29 which can be closed by covers 30 and are provided in the casing 2 above each grid 7. On the outer surface of the casing 2 a heating coil 31 is provided with steam inlet 32 at the top and steam outlet 33 at the bottom part.

The whole casing including the steam coils is covered by a heat insulating material thus maintaining in the interior of the purifier approximately a constant temperature.

For replenishing the compartments with fresh solid contact material, all that is necessary manually, is to release the latches for the grids, individually through the individual manholes for the respective compartments, and mechanically rotate the individual pivots for the grids.

After rotating the individual grids 7 to a vertical position, by application of mechanical means to their pivots from outside the side of the shell, the spent purifying material embedded on the various grids drops to the bottom 3 of the purifier shell and is removed therefrom through an opening 35. Fresh or reconditioned purifying material is then charged through the individual manholes 29 for the compartments after the grids are again returned, by the same mechanical means, into the horizontal position, as shown on the drawing.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A vertical purifier for coke oven gas and the like, comprising: a vertical columnar shell having a gas inlet at its lower part and a gas outlet at its upper parts; a series of horizontal grids for supporting coarse solid material to be contacted by the gas, arranged in superimposed relation in said shell, one above the other, between the gas inlet and gas outlet for said shell, said grids being spaced from one another forming gas and solid contact compartments between each two grids, each of said grids comprising a tiltable horizontal partition provided with openings for passage of gas from the compartment below to the compartment above the respective partitions; hoods of the bubble cap type arranged over each of said openings for diffusion of gas passing through said openings into solid material on said partitions while preventing the flow of solid material past said partitions to the compartment below, said hoods being affixed to said partitions for movement as a unit therewith, and horizontal pivots for each of said partitions, said pivots being mounted on the interior of the columnar shell for tiltably supporting the partitions and their hoods for movement as a unit to an upright position within the shell, for discharge of solid contact material on the partitions to the bottom of the interior of the shell, and for movement of the partitions back to a horizontal position again, for reloading the partitions with fresh solid contact material.

2. A vertical purifier for coke oven gas and the like, comprising: a vertical columnar shell having a gas inlet at its lower part and a gas outlet at its upper part; a series of horizontal grids for supporting coarse solid material to be contacted by the gas, arranged in superimposed relation in said shell, one above the other, between the gas inlet and gas outlet for said shell, said grids being spaced from one another forming gas and solid contact compartments between each two grids, each of said grids comprising a tiltable horizontal partition provided with openings for passage of gas from the compartment below to the compartment above the respective partitions; hoods of the bubble cap type arranged over each of said openings, said hoods comprising a cover and a series of superimposed metal sheets forming side walls of the hoods, said sheets being spaced from one another and downwardly inclined away from the axis of the hoods forming gas passages which subdivide the gas stream as it passes from the openings into solid material on the grids while preventing the solids supported on the grids from dropping through the spaces between adjacent sheets, said hoods being affixed to said partitions for movement as a unit therewith, and horizontal pivots for each of said partitions, said pivots being mounted on the interior of the columnar shell for tiltably supporting the partitions and their hoods for movement as a unit to an upright position within the shell, for discharge of solid contact material on the partitions to the bottom of the interior of the shell, and for movement of the partitions back to a horizontal position again, for reloading the partitions with fresh solid contact material.

3. A vertical purifier for coke oven gas and the like, comprising: a vertical columnar shell having a gas inlet at its lower part and a gas outlet at its upper part; a series of horizontal grids for supporting coarse solid material to be contacted by the gas, arranged in superimposed relation in said shell, one above the other, between the gas inlet and gas outlet for said shell, said grids being spaced from one another forming gas and solid contact compartments between each two grids, each of said grids comprising a tiltable horizontal partition provided with openings for passage of gas from the compartment below to the compartment above the respective partitions; hoods of the bubble cap type arranged over each of said openings for diffusion of gas passing through said openings into solid material on said partitions while preventing the flow of solid material past said partitions to the compartment below, said hoods being affixed to said partitions for movement as a unit therewith, and horizontal pivots for each of said partitions, said pivots being mounted on the interior of the columnar shell for tiltably supporting the partitions and their hoods for movement as a unit to an upright position within the shell, for discharge of solid contact material on the partitions to the bottom of the interior of the shell, and for movement of the partitions back to a horizontal position again, for reloading the partitions with fresh solid contact material, and releasable latches for each of said partitions for locking them in their horizontal positions when under load of solid contact material within the shell.

4. A vertical purifier for coke oven gas and the like, comprising: a vertical columnar shell having a gas inlet at its lower part and a gas outlet at its upper part; a series of horizontal grids for supporting coarse solid material to be contacted by the gas, arranged in superimposed relation in said shell, one above the other, between the gas inlet and gas outlet for said shell, said grids being spaced from one another forming gas and solid contact compartments between each two grids, each of said grids comprising a tiltable horizontal partition provided with openings for passage of gas from the compartment below to the compartment above the respective partitions; hoods of the bubble cap type arranged over each of said openings for diffusion of gas passing through said openings into solid material on said partitions while preventing the flow of solid material past said partitions to the compartment below, said hoods being affixed to said partitions for movement as a unit therewith, and horizontal pivots for each of said partitions, said pivots being mounted on the interior of the columnar shell for tiltably suporting the partitions and their hoods for movement as a unit to an upright position within the shell, for discharge of solid contact material on the partitions to the bottom of the interior of the shell, and for movement of the partitions back to a horizontal position again for reloading the partitions with fresh solid contact material; means above and below each partition for limiting the movement of the partitions to their horizontal positions in restoring them to reloading position, said means also limiting the movement of the partitions in tilting to an upright position for discharge, and releasable latches for each of said partitions for locking them in their horizontal positions when under load of solid contact material.

5. A vertical purifier for coke oven gas and the like, comprising: a vertical columnar shell having a gas inlet at its lower part and a gas outlet at its upper part; a series of horizontal grids for supporting coarse solid material to be contacted by the gas, arranged in superimposed relation in said shell, one above the other, between the gas inlet and gas outlet for said shell, said grids being spaced from one another forming gas and solid contact compartments between each two grids, each of said grids comprising a tiltable horizontal partition provided with openings for passage of gas from the compartment below to the compartment above the respective partitions; hoods of the bubble cap type arranged over each of said openings for diffusion of gas passing through said openings into solid material on said partitions while preventing the flow of solid material past said partitions to the compartment below, said hoods being affixed to said partitions for moving as a unit therewith, and horizontal pivots for each of said partitions, said pivots being mounted on the interior of the columnar shell for tiltably supporting the partitions and their hoods for movement as a unit to an upright position within the shell, for discharge of solid contact material on the partitions to the bottom of the interior of the shell, and for movement of the partitions back to a horizontal position again, for reloading the partitions with fresh solid contact material; means above and below each partition for limiting the movement of the partitions to their horizontal positions in restoring them to reloading position, said means also limiting the movement of the partitions in tilting to an upright position for discharge, and releasable latches for each of said partitions for locking them in their horizontal positions when under load of solid contact material, and a separate manhole for each of the compartments for loading them individually; each of the manholes being arranged in the side of the shell above the lower tiltable partition for their compartments.

6. A vertical purifier for coke oven gas and the like, comprising: a vertical columnar shell having a gas inlet at its lower part and a gas outlet at its upper part; a series of horizontal grids for supporting coarse solid material to be contacted by the gas, arranged in superimposed relation in said shell, one above the other, between the gas inlet and gas outlet for said shell, said grids being spaced from one another forming gas and solid contact compartments between each two grids, each of said grids comprising a tiltable horizontal partition provided with openings for passage of gas from the compartment below to the compartment above the respective partitions; hoods of the bubble cap type arranged over each of said openings for diffusion of gas passing through said openings into solid material on said partitions while preventing the flow of solid material past said partitions to the compartment below, said hoods being affixed to said partitions for movement as a unit therewith, and horizontal pivots for each of said partitions, said pivots being mounted on the interior of the columnar shell for tiltably supporting the partitions and their hoods for movement as a unit to an upright position within the shell, for discharge of solid contact material on the partitions to the bottom of the interior of the shell, and for movement of the partitions back to a horizontal position again, for reloading the partitions with fresh solid contact material; means above and below each partition for limiting the movement of the partitions to their horizontal positions in restoring them to reloading position, said means also limiting the movement of the partitions in tilting to an upright position for discharge, and releasable latches for each of said partitions for locking them in their horizontal positions when under load of solid contact material, and a separate manhole for each of the compartments for loading them individually; each of the manholes being arranged in the side of the shell above the lower tiltable partition for their compartments; each of the latches for the tiltable partitions being disposed within the columnar shell but in position to be accessible from outside the shell through the manholes for the respective compartments, for release and relatching of the partitions for dumping and for reloading; and each of the pivots for the tiltable partitions extending into passages in the side of the columnar shell accessible from outside the shell for application of mechanical means for turning the pivots, to tilt them from their loaded position to an upright discharge position and to return them to their horizontal position for reloading.

7. Apparatus as claimed in claim 6 and in which the vertical columnar shell is surrounded by a cover of heat insulating material arranged in spaced relation thereto to provide an intermediate heating chamber therebetween, and in which means are provided for heating the intermediate heating chamber.

ADOLF SCHMALENBACH.

REFERENCES CITED

The following references are of record in the file of this patent:

UNITED STATES PATENTS

| Number | Name | Date |
|---|---|---|
| 964,719 | Wegescheidt | July 19, 1910 |
| 1,541,147 | Ikeda et al. | June 9, 1925 |
| 1,904,380 | Morrell et al. | Apr. 18, 1933 |
| 2,126,168 | Breuchaud | Aug. 9, 1933 |
| 2,292,716 | Pyzel | Aug. 11, 1942 |
| 2,378,157 | Ramseyer | June 12, 1945 |
| 2,423,013 | Evans | June 24, 1947 |

FOREIGN PATENTS

| Number | Country | Date |
|---|---|---|
| 137,631 | Great Britain | Jan. 22, 1920 |